United States Patent [19]
Smith et al.

[11] 3,823,571
[45] July 16, 1974

[54] MACHINE FOR DISPENSING A SEMI-FROZEN CARBONATED BEVERAGE INCLUDING A SYSTEM FOR AUTOMATICALLY CONTROLLING THE QUALITY OF THE BEVERAGE THROUGH TIMED MODES

[75] Inventors: Dudley C. Smith; Jasper E. Hurley, both of Dallas; John D. Harris, Garland, all of Tex.

[73] Assignee: John E. Mitchell Company, Dallas, Tex.

[22] Filed: July 18, 1973

[21] Appl. No.: 380,150

[52] U.S. Cl.......................... 62/136, 62/69, 62/352, 222/129.3
[51] Int. Cl. ............................................. F25c 7/00
[58] Field of Search ......... 222/129.3, 129.4, 52, 54, 222/146 C, 132; 99/275; 426/474, 477; 62/68, 69, 136, 138, 306

[56] References Cited
UNITED STATES PATENTS

| | | |
|---|---|---|
| 3,403,524 | 10/1968 | Mitchell et al..................... 62/136 X |
| 3,479,835 | 11/1969 | Lane et al........................... 62/69 X |
| 3,533,537 | 10/1970 | Hazlewood ......................... 62/69 X |
| 3,726,102 | 4/1973 | Parks................................ 62/306 X |

Primary Examiner—Robert B. Reeves
Assistant Examiner—Joseph J. Rolla
Attorney, Agent, or Firm—Rogers, Ezell & Eilers

[57] ABSTRACT

This invention relates to a machine for dispensing a semi-frozen carbonated beverage, and particularly such a machine including a system for automatically controlling the quality of the beverage through various timed modes. The machine includes a cooling chamber, means for delivering liquid ingredient to the chamber, means for delivering carbon dioxide gas to the chamber, and refrigeration means for maintaining the liquid ingredient in the chamber to within a prescribed viscosity and temperature range. The temperature and viscosity of the liquid ingredient and the pressure within the chamber are maintained within prescribed ranges during a first operating mode of the machine to produce a semi-frozen carbonated beverage upon dispensing the ingredients from the chamber. The automatic mode control of the machine controls the refrigeration means and liquid and gas delivering means such that during a first operating mode, said viscosity, temperature, and pressure ranges are maintained and delivery of both liquid and gas ingredients is allowed to the chamber, during a second operating mode the liquid ingredient within the chamber is defrosted, and during a period of time between first operating modes the delivery of gas is allowed to the chamber and the supply of liquid ingredient to the chamber is shut off.

10 Claims, 3 Drawing Figures

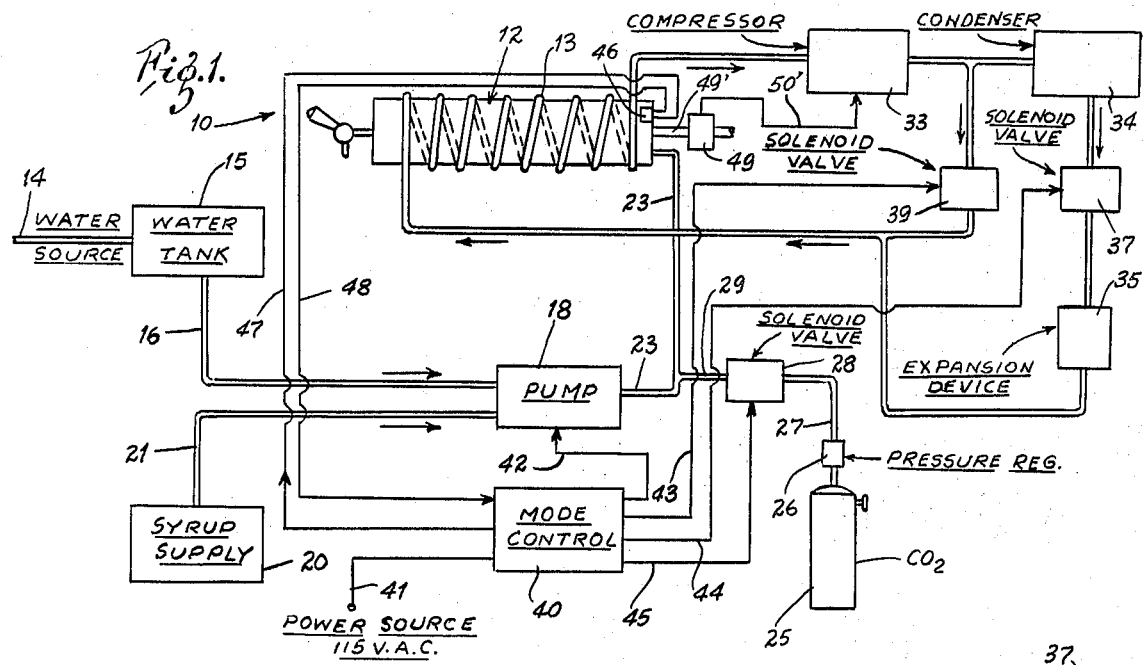
Fig. 1.
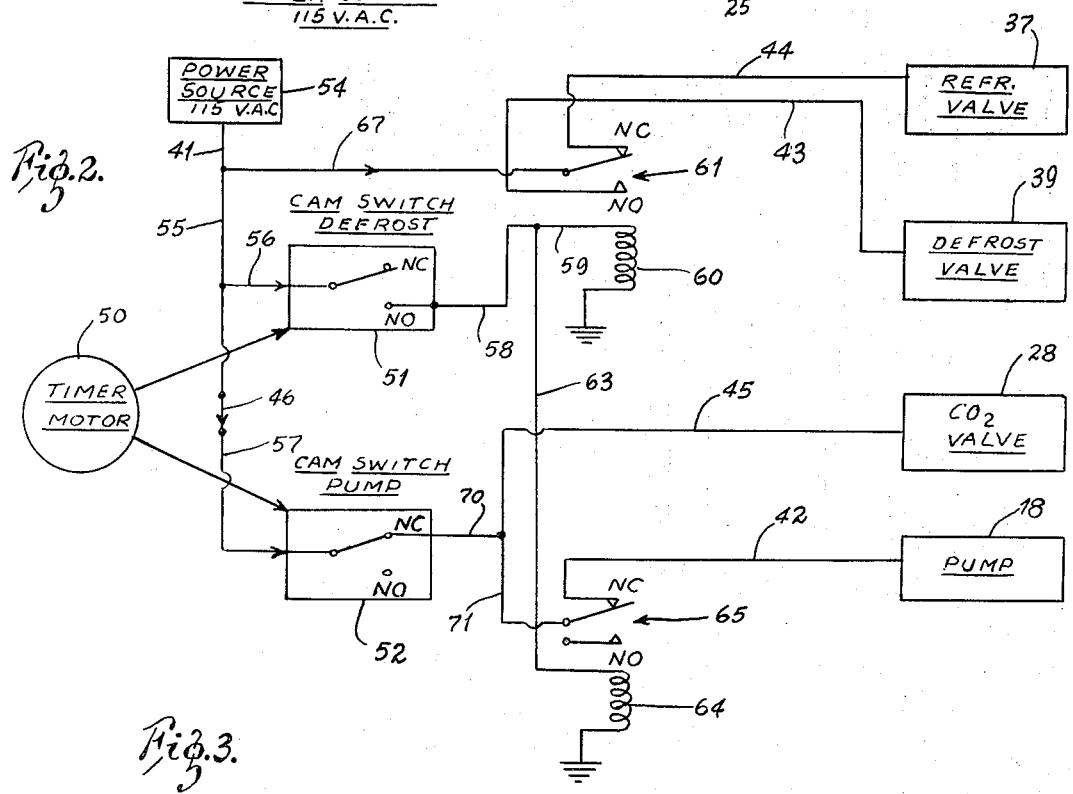
Fig. 2.
Fig. 3.
| OPERATING MODE | CAM SWITCH DEFROST | CAM SWITCH PUMP | REFR. VALVE | DEFROST VALVE | CO₂ VALVE | PUMP |
|---|---|---|---|---|---|---|
| NORMAL REFR. | NC | NC | OPEN | CLOSED | OPEN | ON |
| DEFROST | NO | NC | CLOSED | OPEN | OPEN | OFF |
| DEFROST | NO | NO | CLOSED | OPEN | CLOSED | OFF |
| REFR. | NC | NO | OPEN | CLOSED | CLOSED | OFF |

MACHINE FOR DISPENSING A SEMI-FROZEN CARBONATED BEVERAGE INCLUDING A SYSTEM FOR AUTOMATICALLY CONTROLLING THE QUALITY OF THE BEVERAGE THROUGH TIMED MODES

BACKGROUND AND SUMMARY OF THE INVENTION:

The invention relates to a machine for dispensing a semi-frozen carbonated beverage and an automatic mode control for controlling the quality of said beverage. Such a machine and controls therefor are disclosed in U. S. Pat. Nos. 3,044,878, 3,108,449, 3,510,617, and 3,529,748.

Generally, the machine to which this invention relates and which is described in the above-referenced patents, comprises a cooling chamber in which the ingredients of the beverage, namely, water, syrup and carbon dioxide gas, are fed. The temperature and viscosity of the ingredients within the cooling chamber are controlled by a refrigeration system. Also included is an appropriate control system for controlling the amount of ingredients fed to the cooling chamber so as to maintain the quantity of such ingredients within the chamber at a prescribed amount. Such a control system might include a pressure responsive device which controls the ingredients fed to the chamber in response to chamber pressure as disclosed in the above-referenced U.S. Pat. Nos. 3,510,617 and 3,529,748.

The carbon dioxide gas pressure within the chamber is maintained at above atmospheric pressure, and the temperature of the liquid ingredients within the chamber is maintained below the freezing point of water at atmospheric pressure, but above the temperature where the liquid ingredients readily freeze at the pressure within the chamber. The viscosity of the liquid ingredients is also maintained within prescribed limits. A suitable temperature and viscosity control is disclosed in the above-referenced U.S. Pat. No. 3,108,449. Under these conditions of temperature and pressure and with the viscosity suitably maintained, as beverage is dispensed from the chamber through an appropriate outlet valve to atmospheric pressure, the sub-cooled ingredients immediately form a mass of tiny ice crystals, which mass is impregnated with the syrup flavoring and carbon dioxide.

It has been found that even with the viscosity, temperature, and pressure controls heretofore referred to, over a period of time ice crystals in the liquid ingredients in the chamber begin to increase in size. Eventually, usually after several hours, their size becomes so great that they affect the operation of the machine or a poor quality drink is produced. At this point, it is necessary to place the machine in a defrost mode for several minutes to melt the ice crystals.

Heretofore several systems have been used to defrost such a machine, each involving the delivery of hot refrigerant gas through the cooling coils surrounding the cooling chamber to melt the crystals. One such system involved the manual operation of switches by the machine operator to place the machine in a defrost mode. The operator was then left to guess how long the machine should stay in this mode before reversing the switches and returning it to normal operating mode. Another defrost system also involved the manual operation of switches but included a timer which the operator could set to automatically signal the end of the defrost mode, at which time the operator would again place the machine back in its normal operating condition. Still another system involved the use of a timer which automatically cycled the machine between defrost and normal operating modes.

The conditions of the machine during the defrost and normal operating modes were the same for these prior art systems. During the normal operating mode, the refrigeration system cooled, and both liquid and gas ingredients were supplied to the cooling chamber in response to appropriate sensors to maintain the viscosity and temperature of the liquid ingredients and the pressure in the chamber at prescribed values. During the defrost mode, the refrigeration system delivered hot gas to the cooling coils of the chamber, and neither liquid nor gas ingredients were delivered to the chamber. The result was that the first few drinks drawn from the machine after the defrost mode were flat or deficient in carbon dioxide.

The reason for this is that as ice crystals continue to form and increase in size in the liquid over a period of time, more and more carbon dioxide gas is expelled therefrom and into the space in the chamber above the liquid. As ingredient is drawn from the chamber during dispensing, much of the expelled gas escapes out the dispensing valve into the atmosphere, leaving a low pressure condition in the chamber, in response to which a metered amount of gas and liquid ingredient is fed into the chamber to bring the chamber up to pressure. However, because there was an abnormally low amount of carbon dioxide in the liquid due to the excessive formation of ice crystals, and because the proportion of carbon dioxide to liquid delivered to the chamber remains constant, the level of liquid in the container increases as more ice crystals form. Hence, while the chamber pressure may increase, as the crystals form, it is from an increased volume of liquid and ice, the ratio of gas to liquid decreasing. With the prior art systems, when the ice crystals melted during the defrost mode, the liquid-ice mass volume decreased reducing the chamber pressure and resulting in insufficient carbon dioxide in the chamber to adequately carbonate the liquid ingredients. At the end of the defrost mode when drinks were again drawn from the machine, the drinks were flat. This problem has been solved with the automatic mode control of this invention.

In accordance with the automatic mode control of this invention, even the first drink dispensed from the machine, after the defrost mode, is fully carbonated. This is achieved by automatically controlling the operation of cycle such that during at least a portion of the operating cycle between normal operating mode, carbon dioxide gas continues to be supplied to the chamber to replenish the carbonation in the liquid ingredient.

Hence, it is a primary object of this invention to provide an automatic mode control for the type of machine heretofore described wherein the drinks dispensed from the machine are always fully carbonated, including the first of those dispensed after the defrost portion of the cycle.

This and other objects will become apparent from the drawings and detailed description to follow.

In the drawings:

FIG. 1 is a schematic diagram of a machine of the type to which this invention relates, including an automatic mode control of this invention;

FIG. 2 is an electrical schematic diagram of an automatic mode control of this invention; and FIG. 3 is a chart showing the conditions of various switches and components of the system of this invention during each of its operating modes to aid in understanding the invention.

DETAILED DESCRIPTION OF THE PREFERRED EMBODIMENT:

Referring to FIG. 1 of the drawing, there is shown a general schematic diagram of a machine 10 for dispensing semi-frozen carbonated beverages and including an automatic mode control of this invention.

Generally there is shown a cooling chamber 12 in which the ingredients of the beverage to be dispensed are cooled by a cooling or evaporator coil 13 to a selected viscosity and temperature under a selected pressure. The ingredients of the confection include water, syrup, and carbon dioxide gas. Water is fed from an appropriate water source, such as a typical city water supply through a conduit 14 to a water tank 15. From the water tank 15 the water is fed through a conduit 16 to one input of a pump 18. Syrup is fed from a syrup supply 20 through a conduit 21 to another input of the pump 18. The syrup and water are mixed at the pump, or in an appropriate pre-mix chamber (not shown), and pumped by means of the pump 18 through an output conduit 23. Carbon dioxide gas from the carbon dioxide supply 25 is fed through a pressure regulator 26, a conduit 27, a solenoid valve 28 and a conduit 29 and mixes with the water and syrup mixture from the pump 18 in the conduit 23. The water, syrup and carbon dioxide mixture is fed through the conduit 23 to cooling chamber 12.

The cooling coil 13 is part of a refrigeration system including a compressor 33, a condenser 34 and an expansion device 35, connected as shown. This refrigeration system is basically of a type commonly known in the art except that a solenoid valve 37 is connected in the line between the condenser 34 and the expansion device 35, and another solenoid valve 39 is connected in a conduit which is in turn connected between the output of the compressor 33 and the output of the expansion device 35.

In accordance with this invention, the system also includes an automatic mode control 40 which receives power from an appropriate power source such as 115 volts AC power through a conductor 41. One output from the mode control 40 is connected by means of a conductor 42 to the electrical power input of the pump 18; another output from the control 40 is connected by means of a conductor 43 to the electrical control input of the solenoid 39; another output from the control 40 is connected by means of a conductor 44 to the electrical control input of the solenoid 37; and a fourth output from the control 40 is connected by means of a conductor 45 to the electrical control input of the solenoid valve 28.

The system also includes means for controlling the amount of liquid and gas ingredient and the viscosity of the liquid ingredient within the chamber 12. Such a control for controlling the amount of ingredient in the chamber may be of the type disclosed in the above-referenced U.S. Pat. Nos. 3,510,617 and 3,529,748 and, for example, includes a pressure sensitive switch 46 mounted at the rear of the chamber 12 which closes when the pressure in the chamber drops below a prescribed value. The switch 46 is connected by conductors 47 and 48 to the mode control 40. When the switch 46 is closed, the pump 18 and valve 28 are operated to deliver a metered amount of liquid and gas ingredient to the chamber 12, the switch 46 controlling the amount of liquid and gas ingredient in the chamber. The viscosity control may be of the type disclosed in above-referenced U.S. Pat. No. 3,108,449 and includes a torque sensitive control 49 mounted in a shaft 49' that extends through the chamber 12. Mounted on the shaft 49' within the chamber 12 are suitable paddles (not shown) which are rotated with the shaft to continually mix the ingredients within the chamber. The shaft is driven by a suitable motor (not shown). The torque control device 49 is sensitive to the torque on the shaft 49' which in turn is sensitive to the viscosity of the liquid ingredients within the chamber. The torque control device 49 is connected by an electrical conductor 50' which supplies power to operate the compressor 33 when the viscosity of the ingredients drops below a prescribed value.

The automatic mode control 40, in cooperation with the other refrigeration and ingredient supply controls of the machine, such as those disclosed in the above-referenced U. S. Pat. Nos. 3,108,449, 3,510,617 and 3,529,748, controls the pump 18 and solenoid valves 28, 37 and 39, automatically insuring proper proportioning of all the ingredients in the cooling chamber 12 in each operating mode of the machine.

Referring to FIG. 2 there is shown an electrical schematic diagram of the automatic mode control 40 of this invention. The mode control 40 includes a timer motor 50 which runs continuously and operates a defrost cam switch 51 and a pump cam switch 52. The cam switches 51 and 52 are mechanically operated by the timer 50 as is commonly known in the art. Each of the switches 51 and 52 has a wiper arm and normally closed and normally open contacts. Power from a power source 54 which may be, for example, 115 volts AC, is fed through the conductor 41, a conductor 55 and a conductor 56 to the wiper arm of the cam switch 51. POwer from the power source 54 is also fed through the conductors 41 and 55, the switch 46, and a conductor 57 to the wiper arm of the cam switch 52. The normally open contact of the cam switch 51 is connected by a conductor 58 and a conductor 59 to the coil 60 of a relay 61. The normally open contact of the switch 51 is also connected by the conductor 58 and a conductor 63 to the coil 64 of a relay 65. Each of the relays 61 and 65 has a set of normally open and normally closed contacts and a wiper arm as is common in the art. Power from the power source 54 is also fed through a conductor 67 to the wiper contact of the relay 61. The normally open contact of the relay 61 is connected by the conductor 43 to the defrost solenoid valve 39. The normally closed contact of the relay 61 is connected by the conductor 44 to the refrigeration solenoid valve 37.

The normally closed contact of the cam switch 52 is connected by a conductor 70 and the conductor 45 to the control input of the carbon dioxide solenoid valve 28, and is also connected by the conductor 70 and a conductor 71 to the wiper arm contact of the relay 65.

The normally closed contact of the relay 65 is connected by the conductor 42 to the pump 18.

OPERATION

For ease in understanding the operation of the system of this invention, the chart of FIG. 3 shows the conditions of the defrost cam switch 51, pump cam switch 52, refrigeration valve 37, defrost valve 39, carbon dioxide valve 28 and pump 18 during each mode of the system cycle.

The total cycle has four modes. Mode I is the normal operation portion of the machine cycle with the refrigeration system on as required to maintain the liquid ingredient within the chamber at proper viscosity and temperature, and both liquid and gas ingredients supplied to the chamber 12 as required to maintain proper pressure in the chamber as drinks are drawn from the machine. Mode II is a defrost mode during which the system is rapidly defrosting, carbon dioxide is supplied to the chamber, but liquid ingredient is not. MOde III is also a defrost mode during which the system is in rapid defrost and no liquid or gas ingredients are supplied to the chamber. Finally, mode IV is a refrigeration mode during which the system is in refrigeration to recool the chamber 12, but no ingredients, either liquid or gas, are supplied to the chamber. These modes follow in the sequence given and then repeat.

Assuming the system is at the beginning of Mode I, the defrost cam switch 51 and pump cam switch 52 are in their normally closed positions so that the relays 61 and 65 are deactivated and in their normally closed positions. Power from the power source 54 is fed through the conductor 67, the wiper arm and normally closed terminal of the relay 61, and the conductor 44 to the control input of the refrigeration solenoid valve 37 to open this valve. Since the defrost solenoid valve 39 is connected to the normally open contact of the relay 61, the valve 39 remains closed. With the valve 37 open and the valve 39 closed, and assuming the compressor is on as controlled by the refrigeration control device 49, refrigerant is fed from the compressor 33 to the condenser 34 and from the output of the condenser 34 to the expansion device 35 to cool the chamber 12 and the ingredients therein. Assuming the switch 46 is closed indicating that more ingredient is needed in the chamber, power from the power source 54 is also fed through the conductors 55 and 57, through the wiper arm and normally closed contacts of the pump cam switch 52, and through the conductors 70 and 45 to the control input of the carbon dioxide solenoid valve 28 to hold this valve open. In this condition, carbon dioxide is fed from the carbon dioxide supply 25, through the pressure regulator 26, solenoid valve 28, and conduits 29 and 23 into the cooling chamber 12. Power is also fed through the conductor 71, the wiper arm and normally closed contact of the relay 65, and the conductor 42 to activate the pump 18.

With the pump 18 activated, water from the water tank 15 and syrup from the syrup supply 20 are pumped into the cooling chamber 12.

It should be understood that whether ingredient is supplied to the chamber and whether the refrigeration system cools also depends on the conditions of the switch 46 and control 49, which in turn depend on the viscosity of the ingredients and the pressure within the chamber.

Hence, in mode I of the cycle, the system is refrigerating and liquid and gas ingredients are being supplied to the chamber as required. Mode I is the normal operating mode of the system during which time confection is being dispensed from the machine.

At the end of Mode I, the machine goes into Mode II. At this point the timing motor 50 actuates the cam switch 51 to place the switch 51 in its normally open position. With the switch 51 in its normally open position, power is fed from the power source 54, through the conductors 55 and 56, the wiper arm and normally open contact of the switch 51, and the conductors 58 and 59 to actuate the relay 61 and place it in its normally open condition. With the relay 61 activated, power is fed through the conductor 67, the wiper arm and normally open contact of the relay 61, and through the conductor 43 to the control input of the defrost solenoid valve 39 to open the valve. At the same time, power is removed from the control input of the refrigeration solenoid valve 37 to cause that valve to close. With the valve 39 open and the valve 37 closed, refrigerant, which normally goes from the compressor to the condenser, now bypasses the condenser and expansion device so that hot gas is now fed through the evaporator coil 13 to heat the chamber 12 and defrost the liquid ingredients therein.

With the switch 51 in its normally open condition, power is also fed to the coil 64 of the relay 65 to place the relay 65 in its normally open position, and thus remove power from the pump 18 so that no liquid ingredients are supplied to the chamber 12. Since the cam switch 52 remains in its normally closed position during Mode II, power continues to be supplied to the solenoid valve 28 so that carbon dioxide continues to be supplied to the chamber 12. This continued supply of carbon dioxide during Mode II replenishes any amount of carbon dioxide that might have escaped toward the end of the first mode as heretofore explained. Hence, during Mode II, the refrigeration system is in a defrost condition, carbon dioxide continues to be supplied to the chamber 12 as necessary to replenish any lost supply, but liquid ingredient is not.

At the end of Mode II the timer motor 50 places the cam switch 52 in its normally open position with the cam switch 51 remaining in its normally open position to place the system of Mode III. With the cam switch 52 in its normally open position, power is no longer fed to the control input of the solenoid valve 28, so that this valve closes to shut off the supply of carbon dioxide to the chamber 12. Otherwise the conditions of Mode III are the same as those of Mode II.

At the end of Mode III the timer motor 50 holds the cam switch 52 in its normally open position but places the cam switch 51 in its normally closed position to place the system in Mode IV. With the switch 51 back in its normally closed position, the relay 61 becomes deactivated to its normally closed position and power is once again supplied to the control input of the refrigeration solenoid valve 37 to open that valve, and power is once again removed from the control input of the defrost solenoid valve 39 to close that valve, thus causing the refrigeration to again pass through the condenser 34 and expansion device 35 and begin cooling the ingredients in the chamber 12. Since the switch 52 remains in its normally open position, the carbon dioxide solenoid valve 28 remains closed and the pump 18 remains off so that no ingredients, either liquid or gas, are supplied to the chamber 12.

By the end of Mode IV, the ingredients in the chamber 12 are cooled to the normal operating viscosity and temperature and are fully carbonated so that normal operation and use of the machine can begin. Therefore, at the end of Mode IV, the timer motor 50 again places the cam switch 52 in its normally closed position to open the carbon dioxide valve 28 and activate the pump 18 so that the machine returns to normal operation in Mode I.

Immediately upon return to Mode I operation, confection may be dispensed from the machine, which confection is fully carbonated from the first drink drawn. By way of example, and to give some indication of the relative duration of each mode, it has been found that a Mode I of about 3 hours and 40 minutes, Mode II of 10 minutes, Mode III of 5 minutes, and Mode IV of 5 minutes, in that sequence, produces continuous operation of the machine with each semi-frozen drink drawn from the machine being fully carbonated, including those at the beginning and end of Mode I. These time durations, of course, depend on such parameters as chamber and refrigeration capacity, the number of drinks drawn from the machine per unit of time, and so on, and therefore must be selected in accordance with these parameters.

Hence, there has been described a machine for dispensing a semi-frozen carbonated beverage including an automatic mode control for controlling drink quality, wherein drinks dispensed from the machine are always fully carbonated including the first of those dispensed after the defrost mode.

Various changes and modifications may be made in this invention, as will be readily apparent to those skilled in the art. Such changes and modifications are within the scope and teaching of this invention as defined by the claims appended hereto.

What is claimed is:

1. A machine for dispensing a semi-frozen carbonated beverage comprising a cooling chamber, means for delivering liquid ingredient to the chamber, means for delivering carbon dioxide gas to the chamber, refrigeration means for maintaining the liquid ingredient in the chamber to within prescribed viscosity and temperature ranges, the viscosity and temperature of the liquid ingredient and the pressure within the chamber being maintained within prescribed ranges during a first operating mode of the machine to produce a semi-frozen carbonated beverage upon dispensing the ingredients from the chamber, and an automatic mode control system which system comprises means for controlling the refrigeration means and liquid and gas delivering means during said first operating mode to maintain said viscosity, temperature and pressure ranges and allow delivery of both liquid and gas ingredients to the chamber, means for controlling the refrigeration means and liquid and gas delivering means during a second operating mode to defrost the liquid ingredient within the chamber, and means for controlling the refrigeration means and liquid and gas delivering means during a period of time between first operating modes to allow delivery of gas to the chamber and shut off the supply of liquid ingredient to the chamber.

2. The machine of claim 1 wherein said period of time between first operating modes in which delivery of gas is allowed to the chamber and delivery of liquid ingredients to the chamber is shut off, occurs during said second operating mode.

3. The machine of claim 1 wherein the automatic mode control system further comprises means for controlling the refrigeration means and liquid and gas delivering means during a third operating mode of the machine to reduce the temperature and increase the viscosity of the liquid ingredient to within said ranges and shut off the supply of both liquid and gas ingredients.

4. The machine of claim 3 wherein said third operating mode follows said second operating mode which, in turn, follows said first operating mode.

5. The machine of claim 4 wherein said period of time between first operating modes, in which delivery of gas is allowed to the chamber and delivery of liquid ingredients to the chamber is shut off, occurs during said second operating mode.

6. The machine of claim 1 wherein the liquid ingredients are electrically pumped into the chamber, and the carbon dioxide gas is fed to the chamber through an electrically operated valve, said automatic mode control system further comprising means for electrically controlling operation of the pump and electrically operated valve, in accordance with the conditions of each operating mode.

7. The machine of claim 6 wherein the refrigeration means comprises a compressor, a condenser connected to the output of the compressor, an expansion device connected to the output of the condenser, and a cooling coil connected between the output of the expansion device and the input of the compressor, said cooling coil surrounding said cooling chamber, a refrigerant circulated through the refrigeration means, and means for bypassing the condenser to deliver hot refrigerant to said cooling coil during the second operating mode.

8. The machine of claim 7 further comprising a first electrically operated valve connected between the output of the condenser and the input of the expansion device through which the refrigerant must pass, and a second electrically operated valve connected in a conduit which in turn is connected between the output of the compressor and the output of the expansion device, the automatic mode control system further comprising means for electrically operating the first and second valves to either deliver cold or hot refrigerant to the cooling coil as required in accordance with each mode.

9. A machine for dispensing a semi-frozen carbonated beverage comprising a cooling chamber, means for delivering liquid ingredient to the chamber, means for delivering carbon dioxide gas to the chamber, refrigeration means for maintaining the liquid ingredient in the chamber to within prescribed viscosity and temperature ranges, the viscosity and temperature of the ingredient and the pressure within the chamber being maintained within prescribed ranges during a first operating mode of the machine to produce a semi-frozen carbonated beverage upon dispensing the ingredients from the chamber, and an automatic mode control system, which system comprises means for controlling the refrigeration means and liquid and gas delivering means during said first operating mode to maintain said viscosity, temperature and pressure ranges and allow delivery of both liquid and gas ingredients to the chamber, means for controlling the refrigeration means and liquid and gas delivering means during a second operating mode to defrost the liquid ingredient within the chamber, allow delivery of gas to the chamber and shut off the supply of liquid ingredient to the chamber, means for controlling the refrigeration means and liquid and gas delivering means during a third operating mode to defrost the liquid ingredient within the chamber, and shut off the supply of both liquid and gas ingredient to the chamber, and means for controlling the refrigeration means and liquid and gas delivering means during a fourth operating mode to reduce the temperature and increase the viscosity of the liquid ingredient to within said ranges and shut off the supply of both liquid and gas ingredients.

10. The machine of claim 9 wherein the first, second, third and fourth modes occur in that order.

* * * * *